Patented Nov. 19, 1929

1,735,962

UNITED STATES PATENT OFFICE

HENRY DREYFUS, OF LONDON, ENGLAND

MANUFACTURE OF AN ALIPHATIC COMPOUND

No Drawing. Application filed May 2, 1927, Serial No. 188,403, and in Great Britain May 26, 1926.

This invention relates to the production of acetic anhydride by the pyrogenic decomposition of acetic acid.

According to the present invention I have now found that acetic anhydride may readily be prepared by passing acetic acid vapour over or otherwise in contact with a heated catalyst or contact mass comprising one or more phosphoric acids, for instance, orthophosphoric acid, metaphosphoric acid, pyrophosphoric acid or mixtures of two or more of such phosphoric acids.

The reaction is preferably carried out at temperatures higher than the boiling point of acetic anhydride, for example at temperatures of from about 100° C. and preferably about 150° C. to 400° C.

In performing the invention I may pass acetic acid vapour over the catalyst or contact mass heated to the desired temperature, the phosphoric acid or acids being employed as such, or less advantageously spread upon, deposited on or mixed with porous materials such for example as pumice or kieselguhr or the like. Preferably I pass the acetic acid vapour in a stream over or through the phosphoric acid or acids, the latter being, if desired, subjected to stirring or other agitation.

The phosphoric acid or acids may, if desired, be regenerated continuously with the reaction, for example they may be caused to circulate continuously from the reaction zone through a regeneration zone and then returned to the reaction zone. The regeneration may be effected by heating the phosphoric acid or acids to remove water bound or absorbed thereby.

Preferably I subject the reaction gases to fractional condensation immediately on their leaving the hot reaction zone, to separate the anhydride from water vapour which may be present therein and to recover the acetic anhydride in as pure a form as possible; for example the hot reaction gases may be led up through one or more "fractionating" columns or apparatus preferably maintained at temperatures intermediate between the boiling point of acetic anhydride and of water under the conditions obtaining, whereby the acetic anhydride may be separated from water vapour and, it may be, to any desired degree from any unconverted acetic acid.

If desired however the reaction gases may be caused to recirculate through the hot reaction zone and thus constitute a complete or continuous cycle of operations in which case the reaction gases are preferably treated to remove as far as possible the acetic anhydride contained therein prior to causing them to pass again through the reaction zone; for instance the hot reaction gases may be caused to pass up through one or more fractionating columns, whereby the acetic anhydride may be separated to any desired degree from any unconverted acetic acid, and then led back through the reaction zone.

In performing the process of the present invention the system may, if desired, be maintained under reduced pressure or "vacuum", whether or not the reaction gases are subjected to fractional condensation and whether or not the reaction gases are caused to recirculate through the reaction zone.

The acetic anhydride may be recovered from the crude reaction product, in any suitable way, as for example by fractional distillation, preferably under vacuum, and if desired the crude reaction product may be distilled from dry sodium acetate.

*Example*

Acetic acid vapour generated by heating glacial acetic acid is passed in a stream over or through ortho-phosphoric acid or molten pyrophosphoric acid heated to about 150°-400° C. and the acetic anhydride produced is separated by leading the hot reaction gases or vapours from the reaction zone upwards through one or more fractionating columns.

What I claim and desire to secure by Letters Patent is:—

1. Process for the manufacture of acetic anhydride which comprises thermally decomposing acetic acid vapour in presence of at least one phosphoric acid.

2. Process for the manufacture of acetic anhydride which comprises passing acetic acid vapour over a heated mass comprising at least one phosphoric acid.

3. Process for the manufacture of acetic anhydride which comprises passing acetic acid vapour over a mass heated to temperatures of from 150° to 400° C., said mass comprising at least one phosphoric acid.

4. Process for the manufacture of acetic anhydride which comprises passing acetic acid vapour over a heated mass comprising metaphosphoric acid.

5. Process for the manufacture of acetic anhydride which comprises passing acetic acid vapour over a mass comprising metaphosphoric acid, said mass being heated to temperatures of from 150° to 400° C.

6. Process for the manufacture of acetic anhydride which comprises passing acetic acid vapour over a heated mass comprising at least one phosphoric acid, and subjecting the reaction vapours to fractional condensation.

7. Process for the manufacture of acetic anhydride which comprises passing acetic acid vapour over a heated mass comprising at least one phosphoric acid, and subjecting the reaction vapours to fractional condensation by leading said reaction vapours upwards through at least one fractionating column maintained at temperatures intermediate between the boiling points (under the conditions of pressure obtaining) of acetic anhydride and of water.

8. Process for the manufacture of acetic anhydride which comprises passing acetic acid vapour over a mass comprising at least one phosphoric acid, said mass being heated to temperatures of from 150° to 400° C., and subjecting the reaction vapours to fractional condensation.

9. Process for the manufacture of acetic anhydride which comprises passing acetic acid vapour over a mass comprising at least one phosphoric acid, said mass being heated to temperatures of from 150° to 400° C., and subjecting the reaction vapours to fractional condensation by leading said reaction vapours upwards through at least one fractionating column maintained at temperatures intermediate between the boiling points (under the conditions of pressure obtaining) of acetic anhydride and of water.

10. Process for the manufacture of acetic anhydride which comprises passing acetic acid vapour over a heated mass consisting of at least one phosphoric acid spread upon a carrier.

11. Process for the manufacture of acetic anhydride which comprises passing acetic acid vapour over a heated mass consisting of at least one phosphoric acid spread upon pumice.

12. Process for the manufacture of acetic anhydride which comprises passing acetic acid vapour over a heated mass comprising at least one phosphoric acid, and continuously regenerating said mass by causing said mass to circulate from the reaction zone to a regeneration zone wherein said mass is heated to remove absorbed water, and then returning said mass to the reaction zone.

In testimony whereof I have hereunto subscribed my name.

HENRY DREYFUS.